US008692158B2

(12) United States Patent
McKinley

(10) Patent No.: US 8,692,158 B2
(45) Date of Patent: *Apr. 8, 2014

(54) PORTABLE WELD COOLING SYSTEMS

(71) Applicant: Richard S. McKinley, Palisade, CO (US)

(72) Inventor: Richard S. McKinley, Palisade, CO (US)

(73) Assignee: Fast Fusion, LLC, Palisade, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,290

(22) Filed: Jan. 16, 2013

(65) Prior Publication Data

US 2013/0126503 A1    May 23, 2013

Related U.S. Application Data

(62) Division of application No. 12/701,527, filed on Feb. 6, 2010, now Pat. No. 8,389,902.

(51) Int. Cl.
*B23K 9/12*    (2006.01)
(52) U.S. Cl.
USPC ..................................... 219/137.61; 219/61.7
(58) Field of Classification Search
USPC .......... 219/137, 61, 137.62, 61.7, 76.11, 120, 219/137.9, 133
See application file for complete search history.

(56) References Cited

U.S. PATENT DOCUMENTS

| | | | | |
|---|---|---|---|---|
| 7,098,424 B2* | 8/2006 | Silvestro | ....................... | 219/133 |
| 7,176,412 B2* | 2/2007 | Wells | ....................... | 219/137.61 |
| 7,191,489 B1* | 3/2007 | Heath | ............................. | 15/320 |
| 7,241,973 B1 | 7/2007 | Di Novo et al. | | |
| 7,955,468 B2* | 6/2011 | Beute et al. | ................ | 156/272.2 |
| 8,153,925 B2* | 4/2012 | Sommerfeld | ............ | 219/121.39 |
| 8,156,997 B1* | 4/2012 | Carter et al. | ..................... | 165/47 |
| 8,389,902 B2* | 3/2013 | McKinley | ................ | 219/137.61 |

FOREIGN PATENT DOCUMENTS

JP        2002239778 A       8/2002

OTHER PUBLICATIONS

International Search Report in corresponding PCT Application US2010/050159.
Written Opinion of the International Search Authority in corresponding PCT Application US2010/050159.

* cited by examiner

*Primary Examiner* — David Lam
(74) *Attorney, Agent, or Firm* — Dinsmore & Shohl LLP; Monika J. Hussell, Esq.

(57) ABSTRACT

Portable weld cooling systems include a plurality of weld cooling instruments operable to combine to provide cool air to a weld area created by a weld fusion machine, and a portable cabinet comprising a transportation section and a storage section, the transportation section operable to facilitate the movement of the portable cabinet and the storage section being configured to store the plurality of weld cooling instruments when the portable cabinet is moved, wherein one or more of the plurality of weld cooling instruments may be removed from the storage section when combined to provide cool air.

14 Claims, 5 Drawing Sheets

PORTABLE WELD COOLING SYSTEMS

TECHNICAL FIELD

The present specification generally relates to weld cooling systems and, more specifically, portable and/or self-contained weld cooling systems for use with weld fusion machines.

BACKGROUND

Pipe sections can be welded together to form a single continuous pipe for use in a variety of commercial and industrial applications. To weld pipes together, the principle of heat fusion can be applied where two or more pipe sections are welded to form one fused pipe unit. More specifically, weld fusion machines, and in particular, mobile weld fusion machines can be configured to perform pipe fusion welding under the principle of heat fusion. The principle of heat fusion generally relates to the heating of the end surfaces of two or more pipe sections to a temperature sufficient to at least partially melt the end surfaces. Pressure is then applied to facilitate the fusing of the at least partially melted end surfaces such that a single continuous pipe is produced. More particularly, the fusing of the surfaces under a defined applied pressure allows the end surfaces to intermix and fuse together as the intermixed material of the conjoined end surfaces cools and hardens. As a result, the conjoined pipe sections form one fused pipe unit generally having tensile and pressure strengths substantially equal to those of the individual pipe sections.

However, the speed and efficiency of a weld fusion machine is at least partially dictated by the cooling rate of the welds. Moreover, not all weld fusion machines provide cooling means for weld areas due to monetary and transportability constraints. Accordingly, a need exists for alternative systems for providing portable weld cooling systems capable of adapting and working with weld fusion machines.

SUMMARY

In one embodiment, a portable weld cooling system may include a plurality of weld cooling instruments operable to combine to provide cool air to a weld area created by a weld fusion machine, and a portable cabinet comprising a transportation section and a storage section, the transportation section being operable to facilitate the movement of the portable cabinet, and the storage section being configured to store the plurality of weld cooling instruments when the portable cabinet is moved, wherein one or more of the plurality of weld cooling instruments may be removed from the storage section when combined to provide cool air.

In another embodiment, a portable weld cooling system may include a plurality of weld cooling instruments operable to combine to provide cool air to a weld area created by a weld fusion machine, the plurality of weld cooling instruments can include an air compressor, an air-to-air cooler, a water separator, an air diverter dryer manifold and a vortex tube. The portable weld cooling system may further include a portable cabinet having a transportation section and a storage section, the transportation section operable to facilitate the movement of the portable cabinet and the storage section configured to store the plurality of weld cooling instruments when the portable cabinet is moved, wherein one or more of the plurality of weld cooling instruments may be removed from the storage section when combined to provide cool air.

It is also contemplated that the weld cooling system may be a self-contained, stationary or fixed apparatus, in which case the transportation section or portions thereof may be removable from the remainder of the cabinet, may be rendered temporarily or permanently inoperative, or may be absent.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to portable and/or self-contained weld cooling systems. Portable weld cooling systems may be transported to the site of a weld fusion machine and coupled with the weld fusion machine around one or more pipe sections to provide cool air to the weld area for increased welding efficiency. The portable weld cooling system can generally comprise a portable cabinet that houses a plurality of weld cooling instruments for use in a weld cooling operation. The plurality of weld cooling instruments can include combinations of an air compressor, an air-to-air cooler, a water separator, a dryer manifold, a vortex tube assembly, a halo assembly, and an electronic controller, each as described in more detail herein. Once the plurality of weld cooling instruments are transported to the weld site via the portable cabinet, the weld cooling instruments may be removed from the portable cabinet and/or configured to engage with the weld fusion machine and provide cool air to the weld area during operation of the weld fusion machine.

Figure 1:
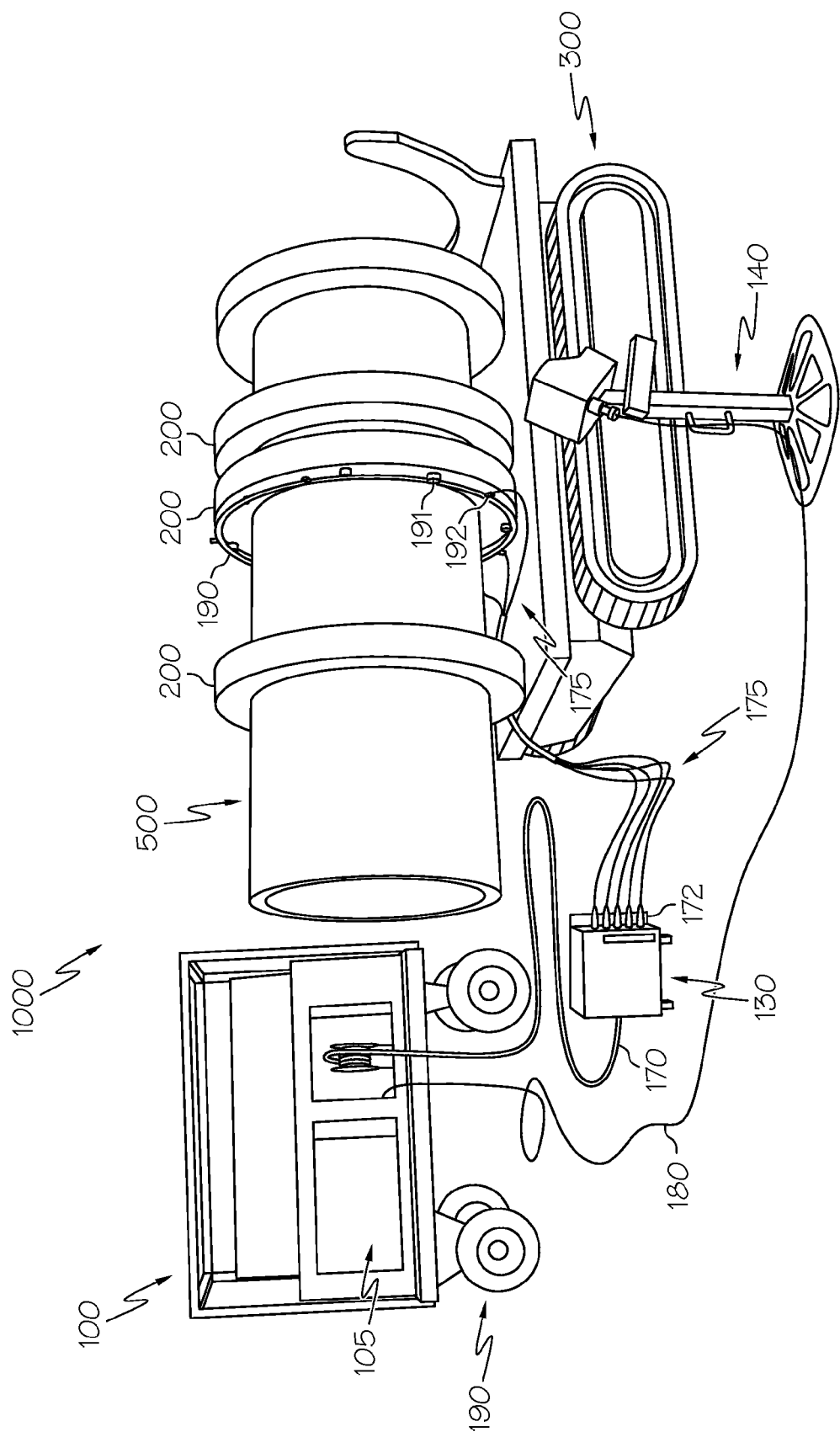
FIG. 1 depicts a portable weld cooling system in operation with a weld fusion machine according to one or more embodiments shown and described herein.

Referring now to FIG. 1, the portable cabinet 100 of the portable weld cooling system 1000 can generally comprise a transportation section 190 and a storage section 105. The storage section 105 can be removably or fixedly attached to the transportation section 190 such that the elements disposed in the storage section 105 can be transported with the weld cooling system 1000 via the transportation section 190. The transportation section 190 can comprise any apparatuses operable to assist in the movement of the portable cabinet 100 from place to place. In one embodiment, such as the embodiment illustrated in FIG. 1, the transportation section can comprise a plurality of wheels coupled to the storage section. For example, in one embodiment the transportation section 190 can comprise three or four wheels integrated with the portable cabinet 100. In another embodiment, such as where the storage section is adapted to house significantly heavier equipment that requires additional support, the transportation section can comprise greater than four wheels such as six or eight. In yet another embodiment, the transportation section 190 may comprise continuous tracks such as those found on heavy-duty construction equipment, with or without wheels. It should be appreciated that the transportation section 190 of the portable cabinet may thereby comprise any structure operable to assist in the transport of the portable cabinet, and more specifically, the transport of weld cooling instruments housed within the storage section 105 of the portable cabinet. Means may also be included to directly or remotely mobilize the transportation section or the cabinet.

However, it is also contemplated that the weld cooling system may be stationary or fixed to a facility, floor or equipment, in which case the transportation section or portions thereof may be a skid, a pallet or other similar device to allow a skid loader or similar apparatus to move and transport the cabinet; similarly, the transportation system may be removable from the remainder of the cabinet, may be rendered temporarily or permanently inoperative, or may be absent.

In one embodiment, the transportation section 190 can simply allow for movement of the portable cabinet when it is pushed, pulled, towed or otherwise displaced (such as by disposing wheels about the portable cabinet wherein the wheels are unhindered in their movement and not connected to a powered apparatus). For example, in one exemplary embodiment, the portable cabinet may further comprise a trailer hitch ball. The trailer hitch ball can be operable to engage an auxiliary hitch such that the portable cabinet may be towed by a car, truck or similar device comprising the auxiliary hitch. In another embodiment, the transportation section 190 may comprise supports that allow for the portable cabinet 100 to be lifted and moved by a fork lift. In yet another embodiment, the transportation section 190 may comprise an integrated support hook allowing the portable cabinet 100 to be lifted and transported by a crane. It should also be appreciated that the transportation section 190 can further comprise any combination of the above mentioned possible embodiments such that the portable cabinet 100 may be transported from place to place when housing the plurality of weld cooling instruments in its storage section 105 as will become further appreciated herein.

Figure 2:
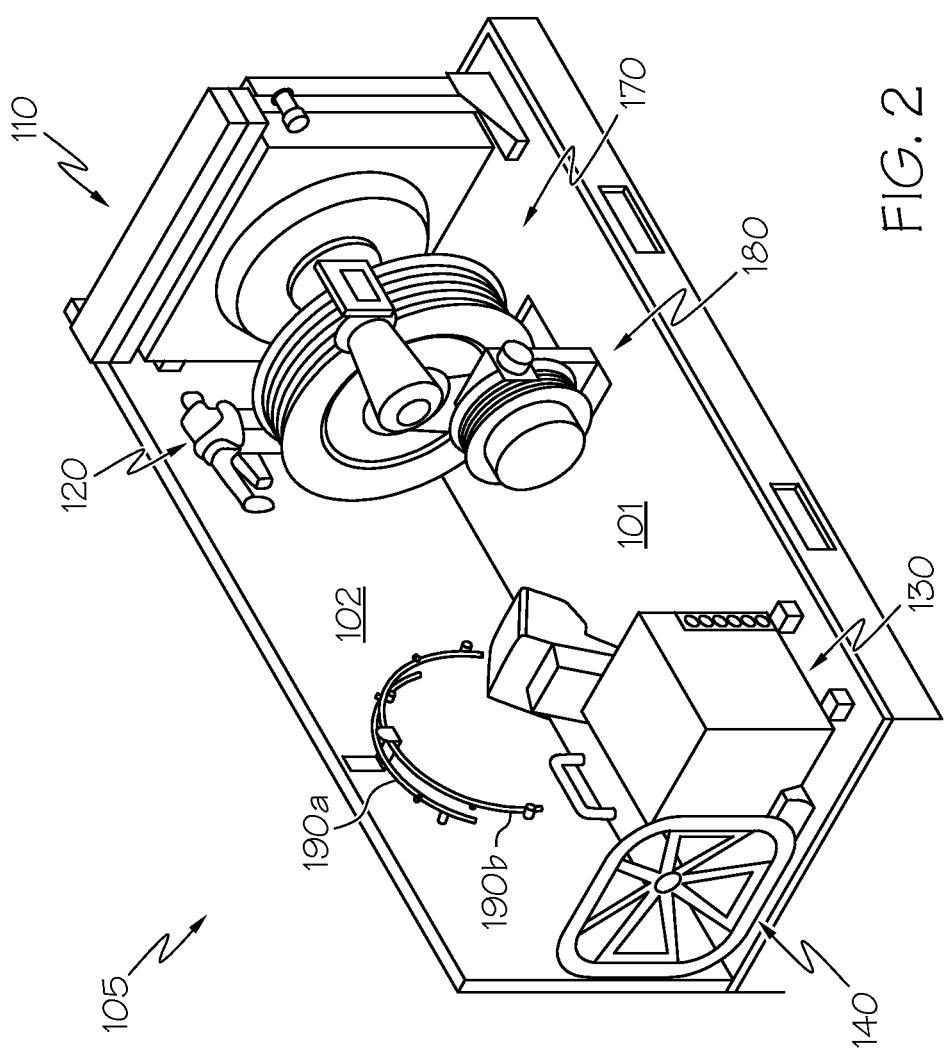
FIG. 2 depicts a storage section of a portable cabinet with a plurality of weld cooling instruments stored therein according to one or more embodiments shown and described herein.
Figure 3:
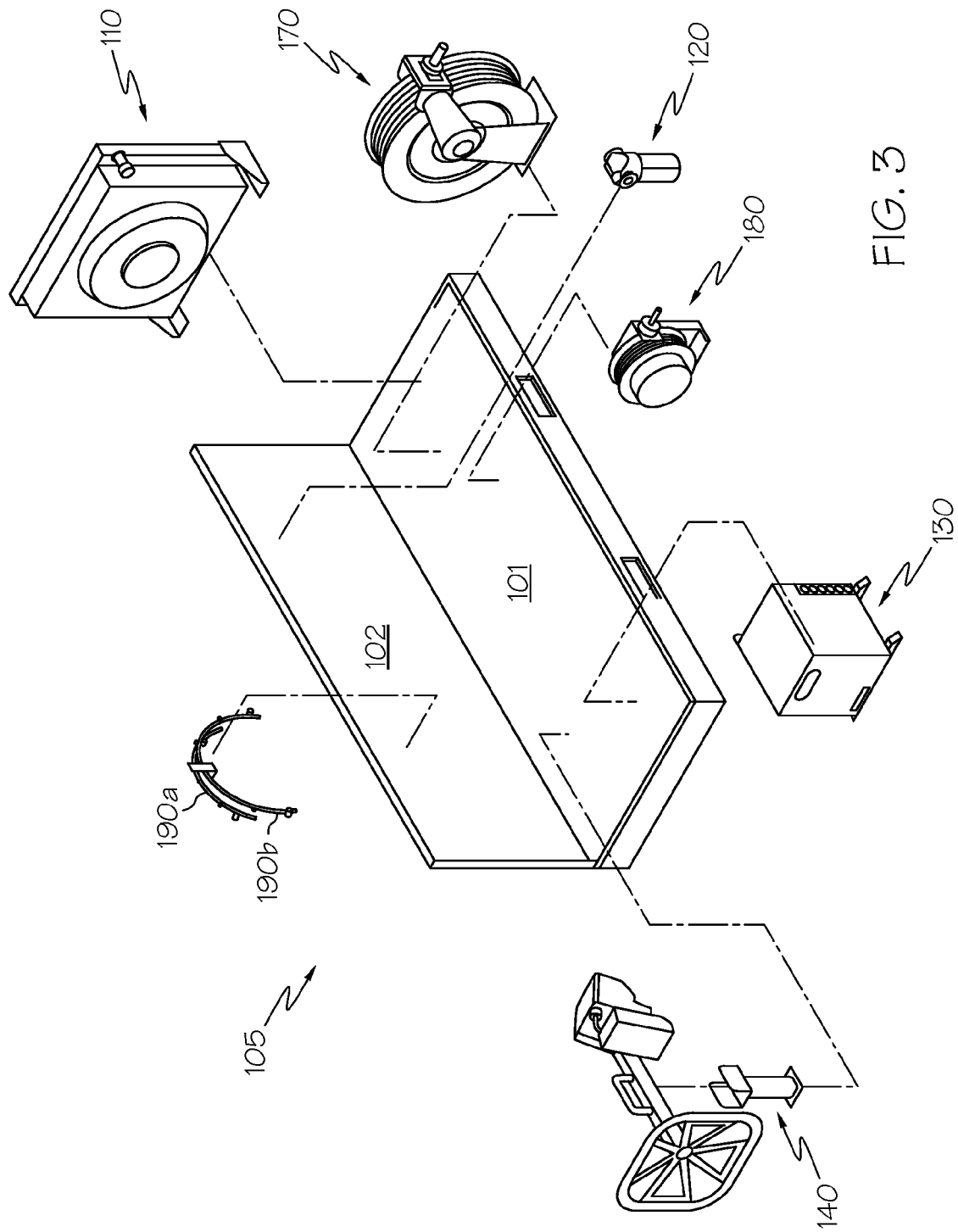
FIG. 3 depicts an exploded view of a storage section of a portable cabinet with a plurality of weld cooling instruments stored therein according to one or more embodiments shown and described herein.
Figure 4:
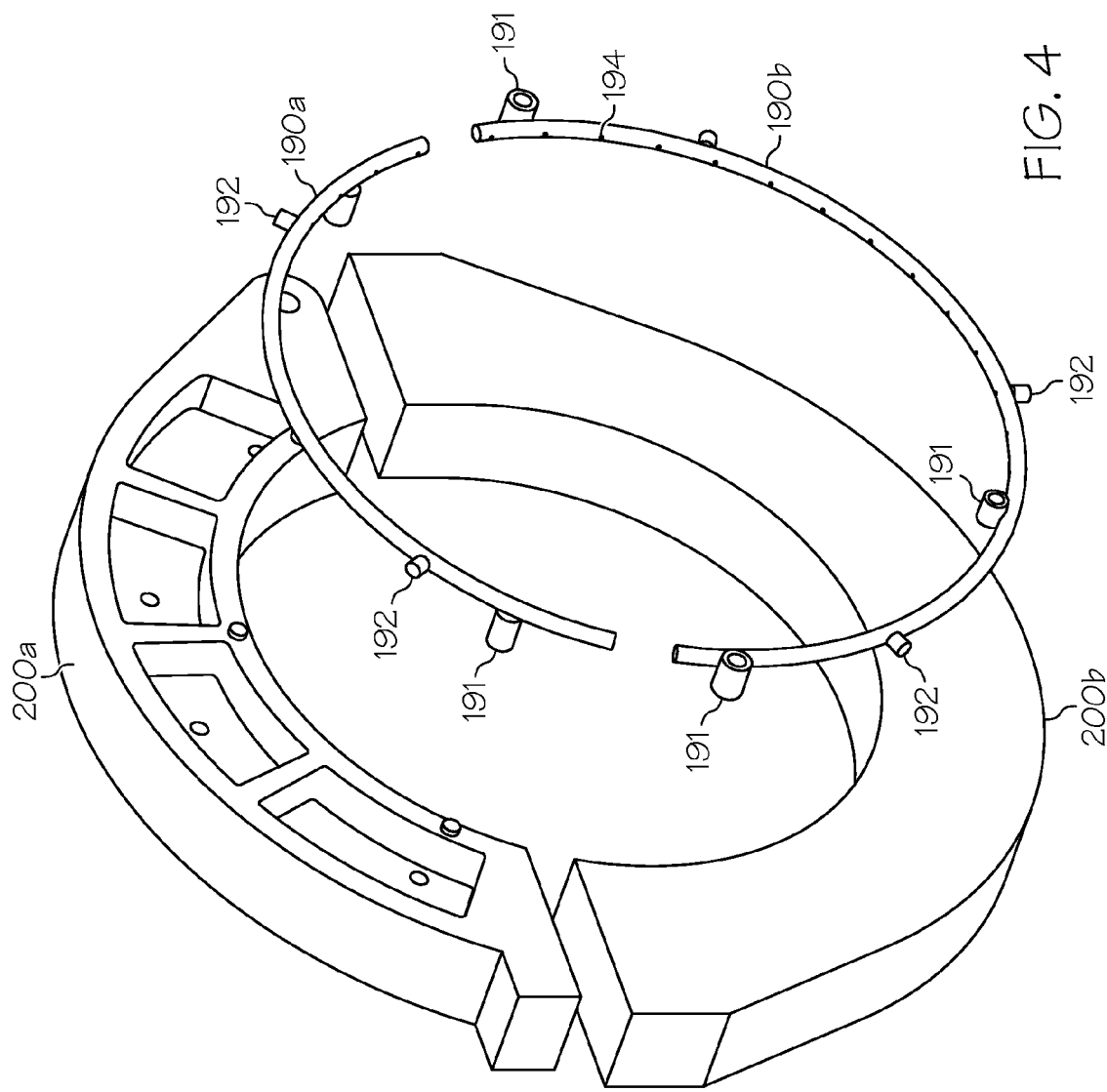
FIG. 4 depicts an exploded view of a halo assembly and a weld support according to one or more embodiments shown and described herein.

Referring now to FIGS. 1-3, the storage section 105 of the portable cabinet 100 can comprise any type of housing operable to store the plurality of weld cooling instruments during transportation of the portable cabinet 100. For example, as illustrated in the embodiment in FIGS. 1-3, the storage section of the portable cabinet can comprise a cabinet that comprises a storage floor 101, a roof and a one or more storage walls 102 to enclose a storage area. In such an embodiment, one or more of the storage walls 102 can further comprise one or more access ports to provide for access to the plurality of weld cooling instruments housed therein. One or more access ports can allow for access to the interior of the storage section 105 wherein the plurality of weld cooling instruments can be placed into or removed from the storage section 105 via the access ports. The access ports can comprise any type of door, sliding wall, removable gate or similar device such that one or more the plurality of weld cooling instruments can pass through the access port.

The storage section 105 of the portable cabinet 100 can comprise a single large compartment or may otherwise be partitioned or separated into a plurality of compartments. For example, where the storage section 105 comprises a plurality of compartments, each individual compartment may comprise its own set of storage walls 102 such that an item stored within said compartment is isolated from a neighboring compartment. In one embodiment, the storage section 105 may comprise a configuration adapted to store specific weld cooling instruments in designated areas or sections. For example, each compartmentalized section can be of a specific shape that compliments a corresponding weld cooling instrument such that the corresponding weld cooling instrument fits into that section. In another embodiment, the storage section 105 can combine with securing hardware to secure each of the plurality of weld cooling instruments into their respective locations. "Securing hardware" as used herein refers to any apparatus that is operable to assist in fixing the location of weld cooling instrument when engaged. Examples of securing hardware include nuts and bolts, screws, brackets, straps, tabs, slits, hooks, clasps or any other similar apparatus or combinations thereof. A single type of securing hardware can be used to secure each of the plurality of weld cooling instruments in place, or, in the alternative, each of the plurality of weld cooling instruments may be secured by one or more types of securing hardware that are selected based on the specific demands of that particular weld cooling instrument.

Still referring to FIGS. 1-3, the plurality of weld cooling instruments can comprise any variety of instruments that combine to provide the flow of cool air to a weld fusion device allowing for the cooling of the weld area for an increase in efficiency as will become appreciated herein. In one embodiment, the plurality of weld cooling instruments can specifically comprise an air compressor (not shown), an air-to-air cooler 110, one or more water separators 120, an airline assembly 130, an air diverter dryer manifold (not shown), a vortex tube assembly 172, delivery tubes 175, a halo assembly 190, and an electronic controller 140. The plurality of weld cooling instruments can further include one or more air hoses 170 and/or communication cords 180 to connect the weld cooling instruments during operation. It should be appreciated that while specific instruments are discussed herein as part of a weld cooling system 1000, they are exemplary in nature and alternative or additional instruments may also be employed.

It is contemplated that two welds, remote from one-another, may be cooled simultaneously with a single system, wherein a plurality of sets of weld cooling instruments are stored and operable from a single cabinet, but sufficiently independent to permit one halo assembly to be located at a weld location remote from a second halo assembly. Preferably, these independent assemblies would operate autonomously or partially-autonomously from one-another (e.g., each having its own electronic controller).

An air compressor may be provided in the portable weld cooling system 1000 to provide compressed air. Specifically, the air compressor may be operable to intake air from its surrounding environment, compress it to a target pressure and direct the pressurized air to the air-to-air cooler 110. The air compressor can comprise any available compressor operable to compress air. In one embodiment, the air compressor may be capable of compressing air to a range of 25 PSI (pressure per square inch) to 1,250 PSI. The air compressor may further comprise an output of 12 CFM (cubic feet per minute) to 1600 CFM. Such compressors may thereby be operable to cool and discharge air at or around 190° F. The air compressor can be specifically manufactured for its intended application requirements as designed for the weld cooling system, or can comprise a commercially available product such as those available from manufacturers such as Doosan Infracore or Ingersoll Rand. The air compressor can be permanently fixed within the storage section 105 of the portable cabinet 100, can be removably secured within the storage section 105 of the portable cabinet 100, or can be otherwise attached, either permanently or removably, to the portable cabinet 100. Furthermore, the air compressor can be driven by its own motor or can be powered by an external motor such as a motor used to drive one or more other instruments used in the welding and weld cooling process.

An air-to-air cooler 110 may also be provided in the portable weld cooling system 1000. The air-to-air cooler 110 can be any device operable to cool compressed air provided from the air compressor prior to the air entering vortex tube assemblies and being directed to a recently welded area along conjoined pipe sections. The air-to-air cooler 110 can cool the compressed air from the air compressor using any methodology operable to allow for cool air to cool a recently welded area. For example, in one embodiment, the air-to-air cooler may cool the compressed air by passing the compressed air over coils containing evaporated fluorocarbons to drive the temperature of the compressed air down. In another embodiment, the air-to-air cooler may pass compressed air over coils containing a cooled liquid to drive its temperature down. Such air-to-air coolers may be operable to cool the compressed air to within 10° F. to 20° F. above the ambient air temperature. It should be appreciated that any other cooling method may alternatively or additionally be employed to cool the temperature of the compressed air after it exits the air compressor and prior to being directed through the vortex tubes.

The air-to-air cooler may be stored, mounted or otherwise disposed anywhere about the storage section 105 of the portable cabinet 100. In one embodiment, such as that shown in FIG. 1, the air-to-air cooler 110 may be mounted to the portable cabinet 100 such that it does not need to be removed for operation of the portable weld cooling system 1000. In another embodiment, the air-to-air cooler 110 may be integrated with the air compressor such that the two instruments can be stored, mounted or otherwise disposed about the storage section 105 of the portable cabinet 100.

The weld cooling system 1000 may further comprise one or more water separators 120. Water separators 120 can comprise any device operable to remove moisture from the compressed and/or cooled air after it exits the air compressor or air-to-air cooler 110. Moisture can include water, oil or any other type of liquid that may be present with the compressed air. For example, in one embodiment, a water separator 120 may be operable to separate moisture from the compressed air after it leaves the air compressor but before it enters the air-to-air cooler 110. In another embodiment, a water separator 120 may be operable to separate moisture from the compressed air after it leaves the air-to-air cooler 110. In yet another embodiment, a plurality of water separators 120 may be positioned such that the water separators 120 separate moisture from the compressed air a first time after it leaves the air compressor and a second time after it leaves the air-to-air cooler 110. Additional water separators 120 may be provided for separating moisture out from cooled and compressed air such as before entering the dryer manifold or directly before entering the vortex tube assembly as will become appreciated later herein. Furthermore, the water separators 120 can be configured to connect with one or more air houses 170 or other weld cooling instruments through threading, quick release valves or any other connection operable to allow the passage of air. Water separators 120 may further comprise one or more drains operable to release the moisture separated from the compressed air. The drains may allow for the release of the separated moisture into any location such as into a storage container, engine exhaust, the environment or any other alternative site. Such water separators 120 can be obtained from various commercial suppliers such as Thermal Transfer Products.

In one embodiment, the one or more water separators 120 may be removably secured to an area in the storage section 105 of the portable cabinet 100. For example, as illustrated in FIG. 2, a single water separator 120 may be secured to the storage wall 102 of the storage section 105 via a hook. In another embodiment, the water separator 120 may be secured to any other location within or about the storage section 105. In yet another embodiment, the water separator 120 may already be connected to the air hose 170 or other weld cooling instrument when it is stored within the storage section 105 of the portable cabinet 100. Furthermore, where the weld cooling instruments comprise a plurality of water separators 120 (either because a plurality of water separators 120 are to be used in the weld cooling system 1000, or because replacement water separators 120 are provided as a preemptive backup), each water separator 120 can be stored in any of the above mentioned locations within the storage section 105 of the portable cabinet 100.

In one embodiment, a valve may additionally be provided in the weld cooling system 1000 and operably stored within the storage section 105 of the portable cabinet 100. The valve may be operable to be positioned between the water separator 120 and the air hose 170 such that the flow of air between the two can be regulated by the valve. The valve can comprise any type of regulator such as one operated by a lever or one operated by a turn screw. The valve may further be disposed independently within the storage section 105 of the portable cabinet 100 when in transit, or may be stored in a connected state with either the water separator 120 or the air hose 170.

Still referring to FIGS. 1-3, the weld cooling system 1000 can further comprise an air diverter dryer manifold operable to receive dry compressed air from the water separator 120 and divert it into the vortex tube assembly so that it can be applied to a recently welded area of pipe section. The air diverter dryer manifold can specifically comprise an interior chamber that further dries the compressed air prior to it entering the vortex tube assembly. In one embodiment, the configuration of the interior chamber may help agitate the compressed air to assist in the drying of the air. For example, the interior chamber may comprise protrusions, contours, a rough interior surface or combinations thereof to create greater turbulence as the compressed air travels through the interior chamber. The dryer manifold can further comprise a plurality of exit ports that separate the compressed air into a plurality of portions as it enters the vortex tube assembly. The plurality of exit ports can be configured to directly engage the vortex tube assembly, or can be configured to engage air hoses that connect to the vortex tube assembly.

Similar to the water separators 120, the air diverter dryer manifold can be removably or fixedly secured anywhere within or about the storage area 105 of the portable cabinet 100. The dryer manifold can be stored independently and in isolation, or can be stored in a connected state where it is already engaging one or more other weld cooling instruments such as a water separator 120, air hose 170 and/or vortex tube assembly.

In one exemplary embodiment, the weld cooling system 1000 may further comprise an airline assembly 130 that can house and/or connect one or more other weld cooling instruments when the weld cooling system 1000 is in operation. For example, as seen in the embodiment illustrated in FIG. 1, the water separator and air diverter dryer manifold can be contained within an airline assembly 130 such that compressed and cooled air exiting the air-to-air cooler passes through the airline assembly 130 prior to entering the vortex tube assembly 172 and/or delivery tubes 175 as will become appreciated later herein. The airline assembly 130 may be fixedly attached to the portable cabinet 100 (wherein other weld cooling instruments are either permanently connected within the airline assembly 130 or detachably connected within the airline assembly 130) or may be removably secured to the portable cabinet 100.

The portable weld cooling system 1000 can further comprise one or more vortex tubes 172 operable to further cool the air as it is directed to the weld zone area, either directly or through one or more halo assemblies 190. Vortex tubes may be operable to cool the air by any amount such as by providing a temperature drop of up to 130° F. In one embodiment, such as that illustrated in FIG. 1, the vortex tubes 172 can be operable to directly engage the air diverter dryer manifold (or the airline assembly 130) such that air passes directly from the air diverter dryer manifold into the vortex tubes 172. In another embodiment, the vortex tubes 172 can be mounted inside the air line assembly 130. In yet another embodiment, the vortex tubes can be mounted directly to the halo assembly 190 wherein delivery tubes 175 transition the air from the airline assembly 130 to the vortex tubes 172 before entering the halo assembly 190. The vortex tubes 172 can comprise any configuration operable to allow for the transfer of pressurized air such as those available from ITW Air Management. For example, in one embodiment, the vortex tubes 172 can comprise a "push to connect" swivel male elbow wherein tubing is simply pushed in to create a connection. In another embodiment, the vortex tubes 172 can comprise any other type of securable connection such as compatible threading, flanges or the like. The vortex tubes 172 can be further operable to separate the pressurized air into a cold stream of air and a warm stream of air wherein the cold stream of air is directed to the weld zone and the warm stream of air is discharged elsewhere, such as at the other end of the vortex tube 172.

In one embodiment, as seen in FIGS. 1-4, the portable weld cooling system 1000 can further comprise a halo assembly 190, or an assembly operable to be mounted around a weld area such that the cold air provided by the other weld cooling instruments can be displaced around a weld. The halo assembly 190 can specifically comprise a plurality of intake ports 192 to receive air from the plurality of vortex tubes 172 and/or delivery tubes 175. An internal channel can then direct the received air to a plurality of exit ports 194 that are configured about an inward facing surface such that the air exiting the plurality of exit ports 194 can be distributed over the length of the halo assembly 190 and onto or about the weld area. The cool air exiting the halo assembly 190 and towards the weld zone may be provided at any temperature operable to assist in cooling such as at a temperature of 30° F. to 50° F. below the ambient air temperature. The halo assembly 190 can comprise any type of configuration that allows for such distribution. In one embodiment, such as that illustrated in FIGS. 2-4, the halo assembly 190 can comprise two or more arcs (for example an upper halo assembly 190*a* and a lower halo assembly 190*b*) that cooperate to form a circle operable to wrap around a pipe section 500 and/or be mounted to a weld support 200 (such as an upper weld support 200*a* and a lower weld support 200*b*). In another embodiment, the halo assembly can comprise a continuous circle that is operable to slide over an open-ended section of pipe. Furthermore, the portable weld cooling system 1000 may comprise a plurality of halo assemblies 190 wherein each halo assembly is individually sized and configured to operate with pipes of certain sizes. For example, a first halo assembly 190 may be provided to cooperate with pipes having an outside diameter from ½ inch to 12 inches. A second halo assembly 190 may be provided to cooperate with pipes having an outside diameter from 12 inches to 20 inches. And, a third halo assembly 190 may be provided to cooperate with pipes having an outside diameter from 48 inches to 65 inches. The halo assembly 190 may be stored anywhere in or about the storage section 105 of the portable cabinet 100 when not in use. For example, in one embodiment, the halo assembly 190 may be hung onto one of the storage walls 102 of the portable cabinet 100. In another embodiment, the halo assembly may be stored in an individual compartment, such as a long short compartment located above or below a larger compartment. The halo assembly 190 may thereby be removed from the portable cabinet 100 and mounted about a pipe section when needed for the operation of the portable weld cooling system 1000.

The portable weld cooling system 1000 may further comprise an electronic controller 140 to assist in its control and operation. Specifically, the electronic controller may be operable to control the amount, rate, pressure and/or temperature of the air applied to the weld area by, for example, controlling the operation of the air compressor or any other weld cooling instruments. In one embodiment, the portable weld cooling system 1000 can comprise a processor, memory and a graphical user interface (GUI). The GUI may be mounted on one end of a stand (such as illustrated in FIG. 1) such that the electronic controller can be positioned in a manner convenient for an operator to utilize while standing proximate the weld cooling operation. In another embodiment, the GUI may be incorporated on a handheld device such that an operator can walk around while controlling the portable weld cooling system 1000 in operation. The electronic controller 140 may also be used to access or input pipe dimensions to compute or reference target welding and/or cooling rates. Using such information, the electronic controller 140 can control the air compressor to manipulate the amount of cool air being applied to the weld. In doing so, a more efficient weld may be realized by accelerating the weld's cooling period. The electronic controller 140 may further be stored in the storage section 105 of the portable cabinet 100 when not in use. The electronic controller 140 may be stored as a single assembled piece, or may be disassembled into a plurality of parts for a more compact storage configuration. In one embodiment, such as that illustrated in FIGS. 2 and 3, the electronic controller may be stored on a support stand mounted to the storage floor 101 of the storage section 105. In another embodiment, the electronic controller may be mounted or hung to the storage wall 102 of the storage section. It should be appreciated that the electronic controller 140 may otherwise be stored in any configuration operable to allow for its transport in the storage section 105 of the portable cabinet 100.

The portable weld cooling system 1000 may further comprise any additional cables or hoses required for its operation. For example, the portable weld cooling system can comprise one or more air hoses 170 to allow for the transfer of air between the plurality of weld cooling instruments. The air hoses 170 may be stored on a reel, in a coil or in any other fashion operable to allow it to be stowed in or about the storage section 105 of the portable cabinet 100 when the portable cabinet 100 is in transit or the portable weld cooling system is otherwise not in use. In one embodiment, a fixed reel may be mounted within the storage section 105 or somewhere about the exterior of the portable cabinet 100 itself. One or more air hoses 170 may thereby be wrapped around the fixed reel such that they can quickly and conveniently be accessed when required. In addition to the one or more air hoses 170, the portable weld cooling system 1000 may further comprise a communications cord 180 operable to connect the electronic controller to a power source and/or the air compressor. Similar to the one or more air hoses 170, the communications cord 180 can be stored anywhere in or about the storage section 105 of the portable cabinet 100 such as on a reel, in a coil or in any other similar fashion.

Finally, the portable weld cooling system 1000 may further comprise a power source operable to power the plurality of weld cooling instruments. The power source can comprise any type of motor, engine or generator operable to supply sufficient power to the air compressor and/or the electronic controller. In one embodiment, the power source may be stored in the storage section 105 of the portable cabinet 100. In another embodiment, the power source may otherwise be provided at the site of the welding operation such that no power source need be stored in the portable cabinet. In such an embodiment, the power source may be used in conjunction with other site operations such as with the weld fusion machine or auxiliary lighting. Such power sources are readily available in the industry such as those produced by John Deere and Ingersoll-Rand.

The cooperation and interconnectivity of the above-described weld cooling instruments of a portable weld cooling system 1000 may be better appreciated through the following case use example of the portable weld cooling system 1000 in operation. With reference to FIG. 1, a plurality of pipe sections 500 may be provided at a construction site wherein it becomes necessary to weld the pipe sections 500 into a single continuous pipe. To weld the pipe sections together, a weld fusion machine 300 is provided. The weld fusion machine is operable to engage and weld two adjoining pipe sections 500. After two adjoining pipe sections 500 are welded into one, the weld fusion machine 300 advances to the end of the now continuous pipe so that the next adjoining pipe section 500 may be added. In an alternative method operation, the welded string of pipe may be pulled, pushed or otherwise transitioned such that a new joint of pipe becomes disposed in the fusion machine for the next weld. To increase the speed and efficiency in which the weld fusion machine 300 can weld adjoining pipe sections 500, a portable weld cooing system 1000 is provided. Specifically, a portable cabinet 100 is transported to the welding site via its transportation section such that the portable weld cooling system 1000 can be positioned proximate the weld fusion machine 300.

Once the portable cabinet 100 is disposed substantially close to or adjacent the weld fusion machine, the portable cabinet is opened such that the weld cooling instruments can be removed from the storage section 105 and assembled. Specifically, the airline assembly 130 is set adjacent the weld fusion machine 300 and the water separator and air diverter dryer manifold are connected within the airline assembly 130. A first end of the air hose 170 is unwound and connected to the water separator in the airline assembly 130. The second end of the air hose 170 is then connected to the air-to-air cooler which is integrated with the portable cabinet 100 and already connected to an air compressor. A halo assembly is further removed from the portable cabinet 100 and connected to weld supports 200 proximate the weld zone, or the area which is welded to join two adjacent pipe sections 500. The vortex tube assembly 172 and delivery tubes 175 are then removed from the portable cabinet 100 and connected to the air diverter dryer manifold in the airline assembly 130 and to the halo assembly 190. Finally, the electronic controller 140 is removed from the storage section 105 of the portable cabinet 100 and set-up proximate the weld fusion machine 300. The communications cord 180 is extended and connected to the electronic controller 140 to provide power and allow for the control of the portable weld cooling system 1000.

An operator may thereby use the electronic controller 140 to instruct the operation of the portable weld cooling system. While in operation, the air compressor intakes air from the surrounding environment and compresses it to a target pressure. The compressed air is then provided to and cooled by the air-to-air cooler such that compressed and cooled air is produced. The compressed and cooled air is then directed through the water separator and the air diverter dryer manifold (both housed within the airline assembly 130) via the air hose 170. By passing the air through the water separator and air diverter dryer manifold, moisture is removed such that the air can be diverted to the vortex tubes 172. Thus, as the compressed, cooled and dried air exits the air diverter dryer manifold, it passes through the vortex tubes 172, the delivery tubes 175 and into the halo assembly 190. The air then exits the halo assembly 190 such that it is applied to the weld area on the pipe 500 around the weld supports 200.

The portable weld cooling system 1000 thereby applies a pressurized cooled air flow substantially uniformly about the fusion joint area of the pipe 500. Characteristics of the air flow, (such as the direction, pressure, flow rate, pattern, temperature, and duration of the cooled air) may be controlled by the plurality of weld cooling instruments to enhance the process of cooling the weld to the desired temperature at the desired rate. For example, the electronic controller 140 may control the duration of air flow by turning on and off the air compressor, the direction of air flow may be controlled by various hardware such as the halo assembly 190, the pressure may be controlled via a pressure regulating valve in the air compressor, the flow rate may be controlled by the air compressor's capacity and motor operation, and the overall temperature of the air may be dependent on a combination of the plurality of weld cooling instruments as well as the surrounding environmental conditions. The initial application of the cooled air flow in the weld zone and about the weld removes the atmospheric blanket of hot or warm air in the weld zone created through the welding process. Once this atmospheric blanket is removed, then the continued application of cooled air flow facilitates the natural transition of the weld to the temperature of the remainder of the pipe sections of the fused pipe unit that are outside of the weld zone. The fusion joint and weld can be kept under fusion pressure until the fusion joint and weld are cool to the touch, which can be determined by a pyrometer or other similar device. The amount of time it takes for the weld to be sufficiently cooled may vary with factors such as, but not limited to, the size of the pipe sections fused, the thickness of the walls forming the pipe sections, the temperature of the heating element, and environmental conditions. The electronic controller 140 of the portable weld cooling system 1000 may further comprise a timer, or other device, such that the portable weld cooling system 1000 may apply air to the fusion joint until an external bead temperature of the material forming the weld is expected to reach a specified temperature or temperature range, such as between about 100° F. and about 140° F. The timer, or other device, may produce an audible sound to notify the operator of the end of the cooling time.

Rather than to simply cool the weld, the portable weld cooling system 1000 provides in the weld zone inside the fusion apparatus what is a natural convection environment equivalent, or substantially equivalent, to environment of the portions of the pipe sections outside of the weld zone. Thereby, the weld cools to the temperature of the pipe sections outside of the weld zone at a rate controlled by the temperature provided by the cooling apparatus. More particularly, the weld zone warms to a higher temperature with the fusing of the pipe sections to form fused pipe units. For the newly formed weld to dry and solidify, the weld must cool to a lower temperature. This temperature generally is that of the remainder of the pipe sections outside of the weld zone. To ensure that the weld is substantially set before moving the fused pipe unit from the fusion apparatus in order to avoid compromising the integrity of the newly formed weld, the temperature in the weld zone, should be cooled to a lower temperature at a predetermined, yet adjustable accelerated rate to correspond with the temperature of the pipe sections of the weld zone.

Figure 5:
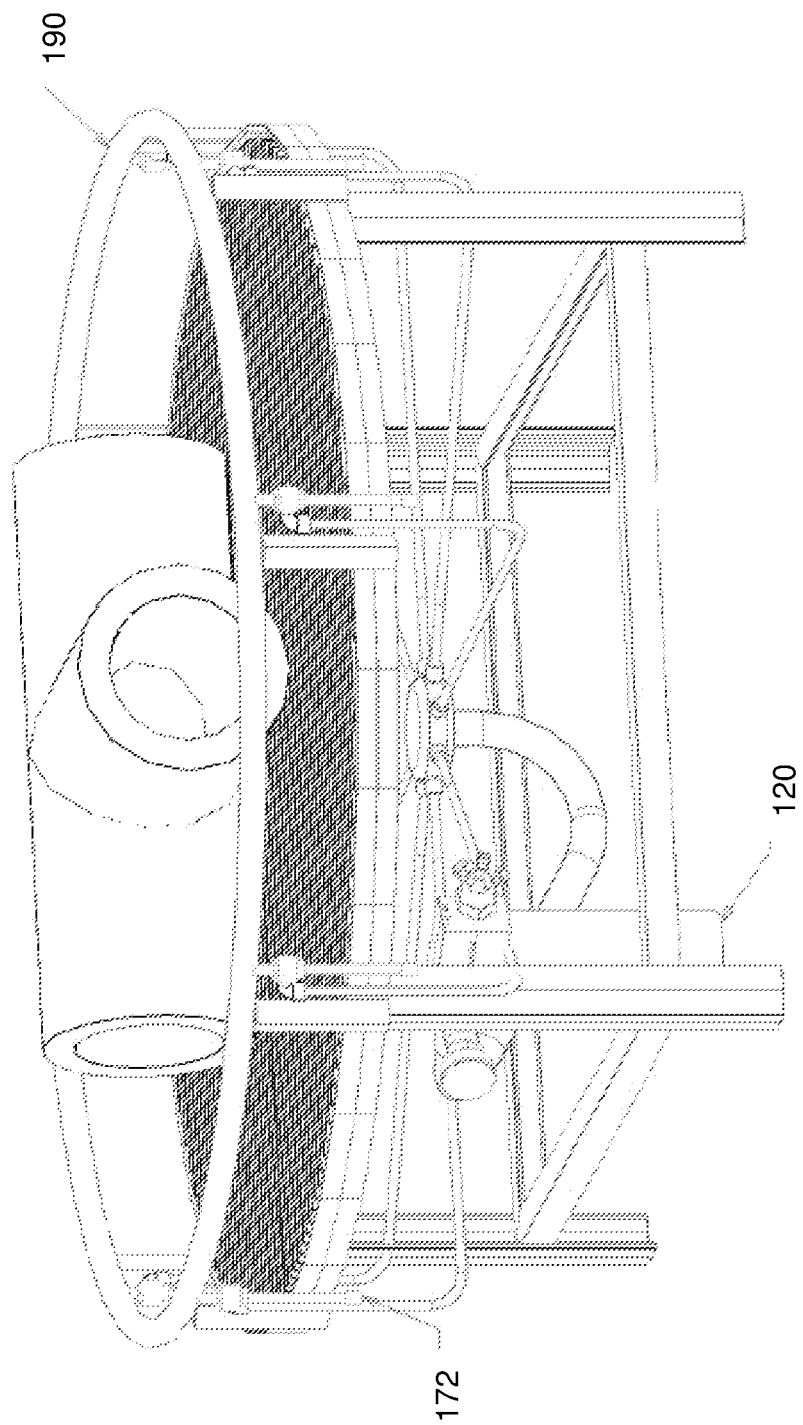
FIG. 5 depicts placement of a halo assembly apart from a weld support, for further cooling as hereinafter described.

In controlled or warmer climates, such as within a facility, where devices such as fittings are being welded by the present system, the halo assembly may be removed from the weld zone after the weld has cooled to at least about 310° F., preferably 280° F., and placed on a surface, with continued flow of cooled air. Alternatively, a second halo assembly may be provided for this purpose. Such a second assembly may be integrated with, or independent of, but consistent with the design of, the system of the present invention as hereinabove described, including in the embodiment shown in FIG. 5. In some embodiments, such a second cooling support system may also comprise a surface to support a fitting or other apparatus within the interior area of the halo tube, vortex tubes, and a moisture separator. In any of these embodiments, the fittings or similar devices may be placed on the surface, within the circumference of the halo, allowing the weld to finish cooling by means of the system of the present invention, apart from the welding apparatus.

It should now be appreciated that a portable weld cooling system may be transported to the site of a weld fusion machine to provide more efficient operation of the weld fusion machine. Specifically, the plurality of weld cooling instruments required to provide cool air to a weld are may be individually stored in a storage section of a portable cabinet. The portable cabinet may thereby be transported to the site via the transportation section wherein the plurality of weld cooling systems can be unloaded and assembled into a weld cooling system. The weld cooling system is thereby coupled with the weld fusion machine around one or more pipe sections to provide cool air to the weld area for increased welding efficiency It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A weld cooling system comprising:
   a plurality of weld cooling instruments operable to combine to provide cool air to a weld area created by a weld fusion machine; and
   a cabinet comprising a storage section, the storage section configured to store the plurality of weld cooling instruments, wherein one or more of the plurality of weld cooling instruments may be removed from the storage section when combined to provide cool air.

2. The weld cooling system of claim 1 wherein the plurality of weld cooling instruments comprises an air compressor.

3. The weld cooling system of claim 2 wherein the air compressor is operable to compress air to a pressure range comprising 25 PSI to 1,250 PSI.

4. The weld cooling system of claim 2 wherein the air compressor is operable to compress air at a rate of 12 CFM to 1600 CFM.

5. The weld cooling system of claim 2 wherein the plurality of weld cooling instruments comprises an air-to-air cooler.

6. The weld cooling system of claim 1 wherein the plurality of weld cooling instruments comprises one or more water separators operable to remove moisture from air.

7. The weld cooling system of claim 1 wherein the plurality of weld cooling instruments comprises an air diverter dryer manifold operable to remove moisture from air and divert the air into one or more tubes.

8. The weld cooling system of claim 1 wherein the plurality of weld cooling instruments comprises one or more vortex tubes operable to separate air into a cold stream of air and a warm stream of air, wherein the cold stream of air is directed towards the weld area.

9. The weld cooling system of claim 1 wherein the cabinet further comprises a transportation section, the transportation section operable to facilitate the movement of the portable cabinet.

10. A weld cooling system comprising:
   (a) a plurality of weld cooling instruments operable to combine to provide cool air to a weld area created by a weld fusion machine;
   (b) said plurality of weld cooling instruments comprising an air compressor, an air-to-air cooler, one or more vortex tubes and a halo structure; and
   (c) a cabinet comprising a storage section, the storage section configured to store the plurality of weld cooling instruments, wherein one or more of the plurality of weld cooling instruments may be removed from the storage section.

11. The weld cooling system of claim 10 wherein the air compressor is operable to compress air to a pressure range comprising 25 PSI to 1,250 PSI, at a rate of 12 CFM to 1,600 CFM.

12. A weld cooling system comprising:
   (a) a plurality of weld cooling instruments operable to combine to provide cool air to a weld area created by a weld fusion machine, the plurality of weld cooling instruments comprising an air compressor, an air-to-air cooler, a water separator, an air diverter dryer manifold, a vortex tube, and a halo assembly operable to be mounted around a weld area such that cold air provided to the halo assembly can be displaced around a weld area; and
   (b) a cabinet comprising a storage section, the storage section configured to store the plurality of weld cooling instruments, wherein one or more of the plurality of weld cooling instruments may be removed from the storage section to the weld area.

13. The weld cooling system of claim 12 wherein the halo assembly comprises an upper halo assembly and a lower halo assembly, a plurality of intake ports, an internal channel, and a plurality of exit ports.

14. A method for cooling a weld by means of a plurality of instruments stored in a cabinet, said plurality of instruments comprising a vortex tub assembly and a halo assembly, wherein the method comprises the steps of:
  (a) removing the vortex tube assembly and the halo assembly from the cabinet, and positioning the halo assembly circumferentially around an area of pipe section;
  (b) receiving, compressing, cooling and dehydrating air from the surrounding environment;
  (c) delivering the compressed, cooled and dehydrated air to the vortex tub assembly;
  (d) delivering at least a portion of the air received by the vortex tube assembly to the halo assembly; and
  (e) by means of the halo assembly, displacing the air received from the vortex tube assembly about the circumference of the pipe section.

* * * * *